United States Patent Office 3,359,326
Patented Dec. 19, 1967

3,359,326
AQUEOUS FORMALDEHYDE SOLUTIONS STABILIZED WITH ACRYLATE POLYMERS
Frederic J. Locke, East Longmeadow, Mass., assignor to Monsanto Company, St. Louis, Mo., a corporation of Delaware
No Drawing. Filed Jan. 21, 1965, Ser. No. 427,180
4 Claims. (Cl. 260—606)

This invention relates to formaldehyde solutions and in particular to the stabilization of aqueous solutions of formaldehyde.

Aqueous solutions of formaldehyde are well-known in the art and various additives have been employed in an attempt to prepare and provide stabilized concentrated solutions of formaldehyde. Currently, when employing 37% solutions of formaldehyde in water, generally no stabilizer is necessary since at this concentration little or no formation of paraformaldehyde occurs. When preparing aqueous solutions of formaldehyde in excess of 37% such as 50% solutions of formaldehyde in water, it is necessary to keep the solution at a temperature of between 50–60° C. in order to prevent formation of paraformaldehyde. Even then, the life of the solution is still somewhat limited to the matter of hours. Various stabilizers have been proposed and used to prepare concentrated solutions. One common stabilizer that is known is methanol. But again, the amount of concentration obtained is still limited with methanol. If great quantities of methanol are employed to provide higher concentrations of formaldehyde in water, methanol becomes detrimental to the end use of the formaldehyde in preparing various thermosetting resins. Other stabilizers have been proposed but again, the quantities necessary are quite large and have an adverse effect on their use in preparing resins such as phenol-formaldehyde, melamine-formaldehyde and urea-formaldehyde type resins. Recently a new stabilizer was discovered which was found to be effective in stabilizing solutions of formaldehyde in water in concentrations of from 30–80% (U.S. Patent 3,137,736). The stabilizers so discovered were high polymer colloids having very high viscosities. For example, 2% of the particular high polymer in water had a viscosity of 3000–5000 centipoises. Such highly viscous materials are difficult to handle and present problems in attempting to meter such highly viscous high polymers into formaldehyde solutions.

It has been surprisingly discovered that certain low molecular weight organic non-colloidal compounds possess the very excellent property of stabilizing aqueous formaldehyde solutions of high concentrations with unusual excellent stabilizing effects.

It is an object of this invention to provide a concentrated stabilized aqueous formaldehyde solution.

Another object of this invention is to provide stabilized concentrated aqueous solutions of formaldehyde containing minor amounts of an organic solvent.

Other objects of this invention will in part be obvious and will in part be set out and appear hereinafter.

Briefly, the above and other objects of this invention including the advantages thereof are attained by dissolving 1–100 parts per million of a low molecular weight non-colloidal polymer in aqueous solutions of formaldehyde. The aqueous solutions stabilized with this particular polymer contain 38–80 weight percent of formaldehyde in water. The particular low molecular weight non-colloidal polymers have a weight average molecular weight range from about 800 to about 10,000. It is of particular interest that the formaldehyde solutions so prepared have greater utility when such solutions have a concentration of about 50% of formaldehyde in water.

The following examples are set forth to illustrate more clearly the principles and practices of this invention to one skilled in the art and they are not intended to be restrictive but merely to be illustrative of the invention herein contained. Unless otherwise stated all parts and percentages are on a weight basis.

Example I

To a 50% aqueous formaldehyde solution, 4 parts per million of an ethyl acrylate polymer are added based upon the total weight of the solution of formaldehyde and water which polymer has a weight average molecular weight of about 5000 as determined by intrinsic viscosity measurements in methanol. The sample is kept at a temperature of 36° C. At the end of 3½ hours, a slight haze is noticed. The haziness is believed to be due to the formation of para-formaldehyde.

As a basis of comparison, a 50% aqueous solution of formaldehyde is also kept at a temperature of 36° C. No stabilizer is employed with this sample and at the end of 75 minutes, a haziness begins to form which is due to the formation of para-formaldehyde. At the end of 3½ hours a heavy precipitate of para-formaldehyde is formed.

Example II

Example I is repeated except that in place of the ethyl acrylate polymer, an ethyl acrylate-methyl acrylate copolymer is employed having a weight average molecular weight of about 4500 as determined by intrinsic viscosity measurements in methanol. The polymer employed herein is a 50 mol percent copolymer of ethyl acrylate with the balance thereof being methyl acrylate. The results obtained are essentially the same as those in Example I.

Example III

Example I is repeated except that in place of the ethyl acrylate polymer, a methyl methacrylate polymer is employed. The polymer has a weight average molecular weight of about 4000 as determined by the same method employed in Example I. The results obtained are essentially the same as in Example I.

Example IV

Example I is repeated except that the sample is kept at a temperature of 50° C. As a comparison, a 50% aqueous solution of formaldehyde without the stabilizer is also kept at a temperature of 50° C. At the end of approximately 10 days the 50% aqueous solution of formaldehyde containing no stabilizer forms a haziness. At the end of 15 days a heavy precipitate of para-formaldehyde is formed. The 50% aqueous solution of formaldehyde containing the 4 parts per million of the ethyl acrylate polymer is still clear at the end of 6 weeks.

The instant invention is directed to a stabilized solution of formaldehyde in water and in particular to highly concentrated solutions of formaldehyde and water. More particularly, the invention is a stabilized solution of 38–80 weight percent of formaldehyde in water which solution has included therein 1–100 parts per million of a low molecular weight non-colloidal polymer having a weight average molecular weight of from about 800–10,000.

In the practice of this invention, as stated previously, the amount of stabilizer to be employed in stabilizing 38–80 weight percent of formaldehyde in water solutions ranges from 1–100 parts per million based on the total of the formaldehyde and water. Preferably, the amount to be employed will vary depending upon the particular stabilizer. This will preferably range from about 4–25 parts per million. However, if longer periods of stabilization are desired, greater amounts of the stabilizer can be used. This may be as high as 100 p.p.m. again depending upon temperature and length of time of stabilization desired. On the other hand, as shown in the examples, as little as 4 parts per million of the stabilizer of this invention will produce satisfactory stabilized solutions of formaldehyde in water.

The polymers employed in stabilizing formaldehyde in water solutions and employed in the practice of this invention are polymers selected from the group consisting of alkyl acrylate homopolymers, e.g., methyl, ethyl, propyl and butyl acrylates; alkyl methacrylate homopolymers, e.g., methyl, ethyl, propyl and butyl acrylates; copolymers thereof which are copolymers of alkyl acrylates or alkyl methacrylates or alkyl acrylates-alkyl methacrylates, e.g., methyl acrylate-ethyl acrylate, methyl acrylate-butyl acrylate, ethyl acrylate-methyl methacrylate, methyl methacrylate-propyl methacrylate, etc.; and terpolymers thereof with dialkyl fumarates and dialkyl maleates, e.g., methyl acrylate-ethyl acrylate-diethyl fumarate, methyl acrylate-methyl methacrylate-diethyl fumarate, methyl acrylate-methyl methacrylate-diethyl maleate, etc., and mixtures of the above. In the practice of this invention, the alkyl radicals should contain 1–4 carbon atoms. It is understood, however, that the limitation of the carbons in the alkyl radical is dependent upon the solubility and the molecular weight of the particular stabilizer employed herein. In addition, the copolymers employed herein may vary over a wide range as to the component parts.

The stabilizers of this invention can be added directly to the formaldehyde aqueous solutions since these polymers are soluble in the formaldehyde while being essentially insoluble in the aqueous phase thereof. Since it may be necessary, however, to meter the stabilizer into the formaldehyde aqueous solution, it is feasible to dissolve the stabilizer in an organic solvent and then to meter this material into the aqueous formaldehyde solution. In the practice of this invention when dissolving the stabilizer in an organic solvent, any of the well-known conventional organic solvents may be used providing that they do not interfere with the stabilization of the formaldehyde solution or that they have no adverse effects on resins prepared employing the stabilized formaldehyde solution. Specifically, the organic solvents can be methyl alcohol, ethyl alcohol, acetone and methyl acetate. If it is desirable to use an organic solvent, the preferred organic solvent to be employed herein is methyl alcohol and the amount is preferably such that the stabilized aqueous formaldehyde solution will contain less than 5% based on the weight of the total solution. In fact, when using any of the organic solvents the total formaldehyde in water solution containing the stabilizer should contain less than 5 weight percent thereof of the organic solvent and preferably less than 0.1% of the organic solvent.

The concentrated aqueous formaldehyde solutions of this invention can be used for the same purpose as any of the same conventional aqueous formaldehyde solutions. For example, they are suitable in preparing phenol-formaldehyde, melamine-formaldehyde and urea-formaldehyde resins. In fact, it is desirable to use the highly concentrated formaldehyde solutions since as such they introduce less water into the reaction than the conventional 37% aqueous formaldehyde solutions.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustartive and not in a limiting sense.

What is claimed is:
1. A stabilized solution of 38–80 weight percent of formaldehyde in water which solution has included therein 1–100 p.p.m. of a non-colloidal polymer having a weight average molecular weight of from about 800 to about 10,000 and being selected from the group consisting of alkyl acrylate homopolymers, alkyl methacrylate homopolymers, copolymers of two alkyl acrylates, copolymers of two alkyl methacrylates, alkyl acrylate-alkyl methacrylate copolymers, terpolymers of two alkyl acrylates and dialkyl fumarates, terpolymers of two alkyl methacrylates and dialkyl fumarates, alkyl acrylate-alkyl methacrylate-dialkyl fumarate terpolymers, terpolymers of two alkyl acrylates and dialkyl maleates, terpolymers of two alkyl methacrylates and dialkyl maleates, alkyl acrylate-alkyl methacrylate-dialkyl maleate terpolymers, and mixtures of the above wherein the alkyl radicals of the above contain 1–4 carbon atoms.

2. The stabilized solution of claim 1 wherein the solution contains less than 5 weight percent of an organic solvent.

3. The stabilized solution of claim 2 wherein the organic solvent is selected from the group consisting of methyl alcohol, ethyl alcohol, acetone and methyl acetate.

4. The stabilized solution of claim 1 wherein the non-colloidal polymer is an alkyl acrylate homopolymer.

References Cited
FOREIGN PATENTS
968,762  9/1964  Great Britain.

SAMUEL H. BLECH, *Primary Examiner.*

W. J. BRIGGS, Sr., *Assistant Examiner.*